(12) United States Patent
Reiner et al.

(10) Patent No.: US 10,754,838 B1
(45) Date of Patent: Aug. 25, 2020

(54) REGISTRATION FRAMEWORK FOR AN ANALYTICS PLATFORM

(71) Applicant: EMC Corporation, Hopkinton, MA (US)

(72) Inventors: David Reiner, Lexington, MA (US); Timothy Bruce, Carrollton, TX (US); Nihar Nanda, Acton, MA (US); Theodore Bardasz, Westford, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 725 days.

(21) Appl. No.: 15/088,029

(22) Filed: Mar. 31, 2016

(51) Int. Cl.
*G06F 16/22* (2019.01)
*G06F 16/245* (2019.01)

(52) U.S. Cl.
CPC ............ *G06F 16/22* (2019.01); *G06F 16/245* (2019.01)

(58) Field of Classification Search
CPC combination set(s) only.
See application file for complete search history.

(56) References Cited

U.S. PATENT DOCUMENTS

| | | | | |
|---|---|---|---|---|
| 7,698,398 B1* | 4/2010 | Lai | ............ | G06F 8/10 709/223 |
| 8,346,929 B1* | 1/2013 | Lai | ............ | G06Q 10/10 709/226 |
| 8,688,625 B1* | 4/2014 | Clark | ............ | G06Q 10/00 707/602 |
| 8,804,731 B2* | 8/2014 | Moses | ............ | H04L 63/0876 370/392 |
| 9,336,332 B2* | 5/2016 | Davis | ............ | G06F 16/9038 |
| 9,613,322 B2* | 4/2017 | Clark | ............ | G06Q 10/00 |
| 2003/0118353 A1* | 6/2003 | Baller | ............ | G03G 15/5075 399/8 |
| 2004/0187140 A1* | 9/2004 | Aigner | ............ | G06F 8/20 719/328 |
| 2005/0278708 A1* | 12/2005 | Zhao | ............ | G06F 8/20 717/136 |
| 2006/0070082 A1* | 3/2006 | Sridhar | ............ | G06F 8/41 719/318 |
| 2006/0123022 A1* | 6/2006 | Bird | ............ | G06Q 10/063 |
| 2007/0180490 A1* | 8/2007 | Renzi | ............ | G06F 21/577 726/1 |
| 2008/0256607 A1* | 10/2008 | Janedittakarn | ............ | H04L 63/08 726/4 |
| 2009/0094584 A1* | 4/2009 | Dheap | ............ | G06Q 30/02 717/130 |
| 2009/0182610 A1* | 7/2009 | Palanisamy | ............ | G06Q 10/06 707/600 |
| 2009/0216438 A1* | 8/2009 | Shafer | ............ | G01C 21/20 701/414 |
| 2012/0158821 A1* | 6/2012 | Barros | ............ | G06F 9/5055 709/203 |
| 2012/0266216 A1* | 10/2012 | Zoller | ............ | G06F 9/451 726/3 |
| 2017/0176958 A1* | 6/2017 | Binotto | ............ | G05B 13/041 |

* cited by examiner

*Primary Examiner* — Miranda Le
(74) *Attorney, Agent, or Firm* — Workman Nydegger (57) ABSTRACT

A registration framework is disclosed that allows assets to be registered with an analytics platform. When an asset is ingested into the analytics platform, the registration framework operates to register the asset in an asset roster. The asset roster identifies the asset and stores information about the asset. The registration framework can then be used by users to discover assets. Assets may also be deployed by the registration framework to workspaces.

9 Claims, 5 Drawing Sheets

REGISTRATION FRAMEWORK FOR AN ANALYTICS PLATFORM

FIELD OF THE INVENTION

Embodiments of the invention relate to data analytics. More specifically, embodiments of the invention relate to systems and methods for registering assets with an analytics platform.

BACKGROUND

Generally, data analytics relates to the process of drawing information or conclusions from data. Data analytics relates, for example, to data mining, model development, predictive data modeling, and the like. An analytics platform provides tools so that users of the platform can analyze the data and perform data analytics.

There are many uses for an analytics platform. Users of an analytics platform can use the tools and the data sets of the analytics platform to perform investigations, develop models, make predictions, and support policies. An entity or user, for example, may use an analytics platform to evaluate business data in order to help the business make better decisions or to model the behavior of their customers or to predict sales. An analytics platform may be used to investigate theories and correlations and for other reasons.

Even though analytics platforms can provide very powerful tools, there are still weaknesses that limit their effectiveness. For example, analytics platforms often store data sets in a large repository. Once the data sets are imported and stored in the repository, some of the data sets may become unused over time. Data sets tend to become lost in the sense that users may not be aware of their existence and potential use. In addition, relationships between data sets are difficult to understand and track and the ability to discover relevant data and tools for analytic projects is cumbersome. Systems and methods are needed to facilitate the way in which data sets and other assets in analytics platforms are accessed and used.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to systems and methods for performing data analytics. Embodiments of the invention further relate to a registration framework for an analytics platform and to systems and methods for registering assets with an analytics platform. The registration framework is configured to register assets with the analytics platform.

Assets registered with the analytics framework may include, but are not limited to, data sets, data sources, connections to data sources, tools, applications, controllers, scripts, platforms, programs, services, or a connection to a data set or the like or any combination thereof. Other assets include services, templates, scripts, 12-factor applications, commercial tools, analytic models, reports, visualizations, virtual machines, and the like.

Examples of data sets further include, but are not limited to:

| Data Set | Examples |
| --- | --- |
| Relational table | Customers, Employees, Transactions, Resource access history, Time series summary |
| File | Flat file, Audio recording, Photo, Process output file, Log file, Hadoop file, BLOB (Binary Large Object) |
| Key-Value pairs | Twitter hash tag counts, Diagnosis codes, Sensor data, Index, Cache |
| Stream of elements | Market ticks, Surveillance video, Messages, RFIDs, Sensor data |
| Graph | Employee skills, Transit routing, Network assets, Access permissions, Web browsing behavior, Gene sequences, Social media influence, Recommendation engine internals |
| Query or search result | Emails from an archive, Medical test results, Current product suppliers, Product pricing at a given time |
| Document | MongoDB document, XML document, RSS feed, Financial results (XBRL), Website content |
| Report | Sales by region, Top blog topics in last 24 hours, A-B Marketing test results |
| Web Service | Customer discount by volume, Shipment tracking |
| Index | Content index, Federated content index |

These are examples of data sets or assets that can be registered by the registration framework. Tools, applications, services, or the like may be used to perform operations or analytics on these data sets.

A registration framework can facilitate and improve many of the functions, purposes, and operations of an analytics platform. The registration framework allows new assets and existing assets to be registered, discovered, accessed, deployed, and used in isolation. The assets can be used in isolation from an asset security perspective as well as a data protection perspective. The registration framework allows new and/or existing assets to be used independently or combined and analyzed together. The registration framework allows asset histories (e.g., different versions of an asset, manner in which an asset has been used in the past, history of conclusions or results drawn from assets), asset lineage (e.g., how the asset has been transformed) and relationships between assets to be discovered and/or considered when performing analytics. Relevant data sets (or assets) for a given project can be discovered after the data sets (or assets) are registered by the registration framework. More generally, assets registered by the registration framework can be discovered, searched, annotated, tagged, used, revised, changed, transformed, or the like or combination thereof.

The registration framework allows assets to be treated in a uniform manner regardless of whether the asset is an existing asset in the analytics platform or a new asset being added to or ingested into the analytics platform. Embodiments of the registration framework can be used on assets that already exist within the analytics platform or on assets that are newly added to the analytics platform. The registration framework may associate metadata with the assets and the metadata can be organized in a uniform manner so that, when the registration framework is searched, assets corresponding to the search parameters can be identified.

The registration framework may be able to cope with multiple tool sets. Embodiments of the invention allow groupings of applications and tools to be known, observed and followed. Embodiments of the invention allow tools and applications to be meaningfully grouped and consistently manipulated.

Embodiments of the invention provide an extensible registration framework that may be used to describe and register assets of any type, form, and/or state. The registration framework can support transformations and deployments of assets as needed into any container that would be suitable for a deployment of an asset of a type, form, and/or state. The result can be a transformed asset of a different type and form and state and the framework understands this transformation and the resulting registered asset. The registration framework is extensible in that a description language enables new classes of assets to be added to the registration framework and to the analytics platform. The registration framework may also specify the deployment and transformation steps for assets including new classes of assets.

Figure 1:
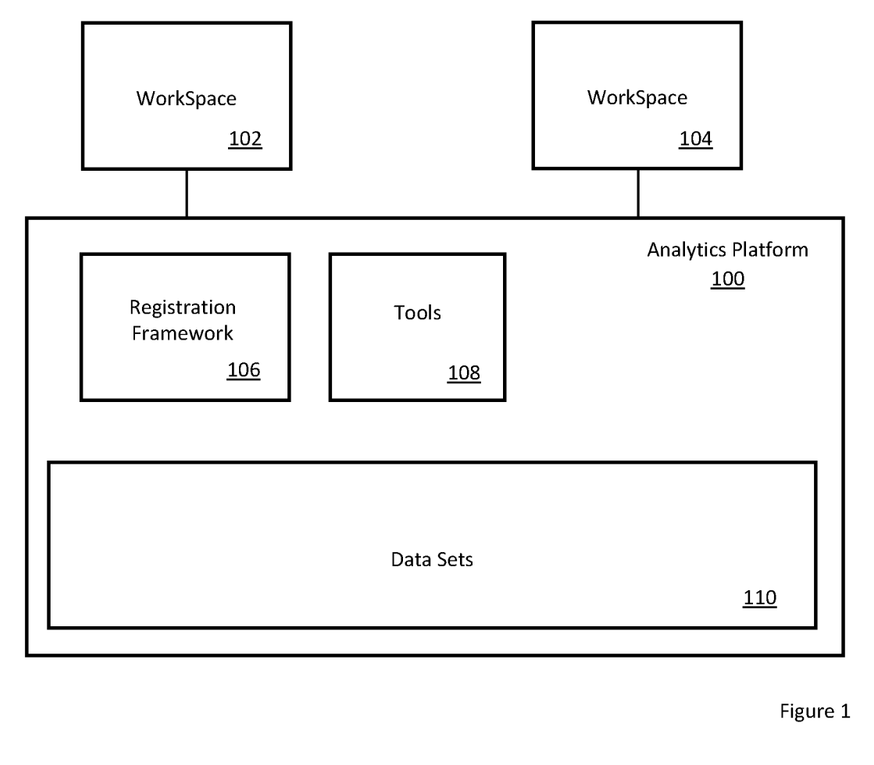
FIG. 1 illustrates and example of an analytics platform that includes a registration framework.

FIG. 1 illustrates an example of an analytics platform 100. The analytics platform 100 includes assets such as, but not limited to, tools 108 and data sets 110. By way of example, users of the analytics platform 100 perform analytics in a workspace such as the workspace 102 or the workspace 104. The workspace 102 can be provisioned with various assets such as at least one of the tools 108 and at least one of the data sets 110. The workspace could be provisioned with a partial data set as well. In one example, assets (or portions thereof) are deployed to the workspace 102 by the analytics platform 100.

In one example, the workspace 102 is an isolated, managed, self-service container of virtual machines (VMs) and working data sets, configured and deployed to the workspace 102. The workspace 102 establishes the data sets and tools (and other assets) that are accessible by a user when interacting with the analytics platform and in particular when interacting with assets such as data sets. In one example, workspaces can provide a quota-managed, policy-governed, private sandbox that enables data exploration, transformation, enhancement, and analysis. The workspaces 102 and 104 facilitate the use of tools, applications including business applications and services and help with the new development of analytic tools and analytic models In one example, a workspace may include a computing device that is configured to access the data sets 110 and other assets of the analytics platform 100. In one example, the data sets 110 or copies of the data sets 110 or portion thereof may be deployed to the workspace. The data sets 110 may be accessed using a browser window or using specific applications or services. When a workspace is instantiated, the workspace may be provisioned with applications and/or tools and/or services or other assets. In other words, tools, applications and data sets may be configured and deployed to a workspace. The deployed assets are used by a user to perform analytics.

The analytics platform 100 also includes a registration framework 106. The registration framework 106 may interact with or be used by any of the other components of the analytics platform 100 including the workspaces 102 and 104.

When an asset is initially registered with the analytics platform 100 (for example when ingesting the asset into the analytics platform 100), the asset is included in or identified in the registration framework 106. More specifically, the registration framework 106 may store information about the asset being registered. Some of the information maintained by the registration framework 106 may include metadata that is intrinsic or inherent to the asset. When the asset is a data set, for example, the information may include creation date, size, format, number of records, and the like. This type of metadata can be derived from the asset itself, often automatically.

Another type of metadata that may be associated with the asset and that may be identified or referenced in the registration framework includes information that may be collected during the registration process or over time. For example, a submitter of the asset may be queried for information related to the asset. The query may ask for information that cannot be derived or reasonably inferred from the asset itself. Another type of metadata may include metadata that may be generated or obtained over time. For example, the registration framework may maintain information for an asset that relates to deployment of the asset, parameters of deployment or how to deploy the asset (different from search parameters), state of the asset (hydrated versus dehydrated). For example, the state (e.g., hydrated or dehydrated) of the asset can affect deployment. For example, a data set may be associated with a source and a destination. In one example, the data set is hydrated in the source. In order to deliver the data set to the destination, however, the source may need to be dehydrated or placed in a context that may be independent of the source and/or the destination. At the destination, the source may be hydrated. When the data is hydrated at the destination, it may be in a different form compared to the hydrated state at the source. Hydrated refers, in one example, to a state in which the asset is usable. For example, an asset hydrated into a first database cannot simply be moved to a second database of a different type from the first database. Rather, the asset must be dehydrated when extracted or removed from the first database and hydrated into a meaningful form for the second database.

When an asset is, for example, hydrated (e.g., a data set deployed in a NoSQL data store), the registration framework may indicate that the asset may need to be extracted, converted to another file type before being deployed or as part of the deployment process. The deployment process may involve converting the asset or transforming the asset to another type or state. A data set that is to be deployed into a database, for example, may be hydrated or prepared for deployment into that database. For example, a data set that is in a comma separated value (csv) format (e.g., dehydrated) may be converted into a state (e.g., deployed or hydrated) suitable for a spreadsheet or a database. Another example of a data set is a streaming feed (e.g., stock quotes or a sensor feed). Deployment of this asset may include information about the source so that the asset can be connected to the workspace. The information coming from the feed may then be transformed and stored in another structure if necessary. The state of the asset or characteristics of the asset may influence how the asset is deployed. The registration framework may maintain the state of the asset so that use of the asset can be enabled or permitted.

The registration framework enables assets to be deployed by maintaining information that is used during deployment.

The information related to deployment may instruct a service, script, or other component associated with the analytics platform or external to the analytics platform how to deploy the asset. Alternatively, the registration framework may deploy the asset. In one example, the registration framework not only identifies whether the asset needs to be transformed (e.g., hydrated or dehydrated), but also enables and automates the transformation of the asset. For example, a data set that is stored as a csv file may be transformed into another type such as a database table or a spreadsheet during deployment or at another time. The original data set may remain unchanged. The registration framework enables the analytics platform 100 to deploy different asset types automatically and the registration framework may deploy the asset. Alternatively, the actual deployment of assets may be performed by another module or component of the analytics platform 100.

Thus, metadata or information associated with the registration and use of an asset in the analytics platform 100 may be included in or referenced by the registration framework 106 and associated with the asset. In one example, the registration framework 106 may include an asset roster and the metadata may be stored in the asset roster. The asset roster may identify the assets included in or available to the analytics platform 100. Each asset in the roster may be linked or associated with the asset's metadata.

Over time, the metadata stored in the registration framework 106 can increase or change. For example, use of an asset may result in an assessment of the quality of the asset, user satisfaction with the asset, user annotations related to the asset, the quality of results of asset transformation, a changed state of the asset or the like. This information can be added to the registration framework.

The registration framework 106 also allows users to search for and/or discover assets. For example, a user looking for a specific asset may provide search parameters that are related to the asset. For example, the metadata associated with an asset may indicate that that the asset includes population data. The search parameters may include population parameters (e.g., geographical or political region). The registration framework 106 can be searched using the parameters provided by the user. For example, a user can search for assets specific to a geographical or political region by specifying the region as one of the search parameters. Results of the search of the registration framework or of the asset roster may identify assets that may be of interest to the user based on the parameters. Further, some of the results may refer to assets that the user may have been unaware of at the time of the search. In addition, the registration framework may also suggest assets that may be unrelated or distantly related to the search parameters. The registration framework may include some results that are similar to assets previously selected by the user or deployed in the user's workspace. The search results may also include assets that may have been used by other users.

The registration framework 106 can also be used to store relationships between users and between assets. The analytics platform 100, for example, may use the registration framework 106 to proactively inform users about changes to the assets or relationships between the assets. For example, a user may be performing analytics on a data set that reflects purchases at an entity's physical locations. In the meantime, additional data for the data set may be added to the analytics platform or a change may have been made to the data set. In this scenario, the asset change and the relationship of the user or workspace to the asset may be noted and a user may be advised that additional data is available or that the user may be using outdated data. The registration framework may be configured to push notifications to users regarding assets currently accessible to the users. The registration framework may also recommend assets or tools to a user. The registration framework can use many relationships to provide these types of notifications. Assets used by or accessible to the user, assets used by other users, changes to assets, or the like are examples of relationships that can be tracked and used to generate notifications.

In addition, the registration framework 106 may identify more complex relationships among different assets and between assets and users. Asset histories, versions, lineages, and relationships can be maintained in the registration framework 106 and leveraged by the analytics platform 100 and by users of the analytics platform 100. By way of example, these relationships may also be stored in the asset roster or in another structure in or available to the registration framework.

The registration framework 106 may also enforce policies or coordinate with an asset governor that is configured to maintain and enforce policies with respect to the registration of an asset. For example, a user may need to be authenticated in order to register or use an asset. The user may also need to be authorized (e.g., have appropriate permissions, have appropriate role, have appropriate context). However, authentication and authorization may be optional.

The registration framework 106 may only allow certain types of assets to be registered in the analytics platform 100. Alternatively, only certain users may be able to register assets. The policies associated with asset registration may be related to the user, to the asset, to the environment in which the asset is to be deployed, to the environment or context in which registration is requested, to the source of the asset, or the like or combination thereof.

Figure 2:
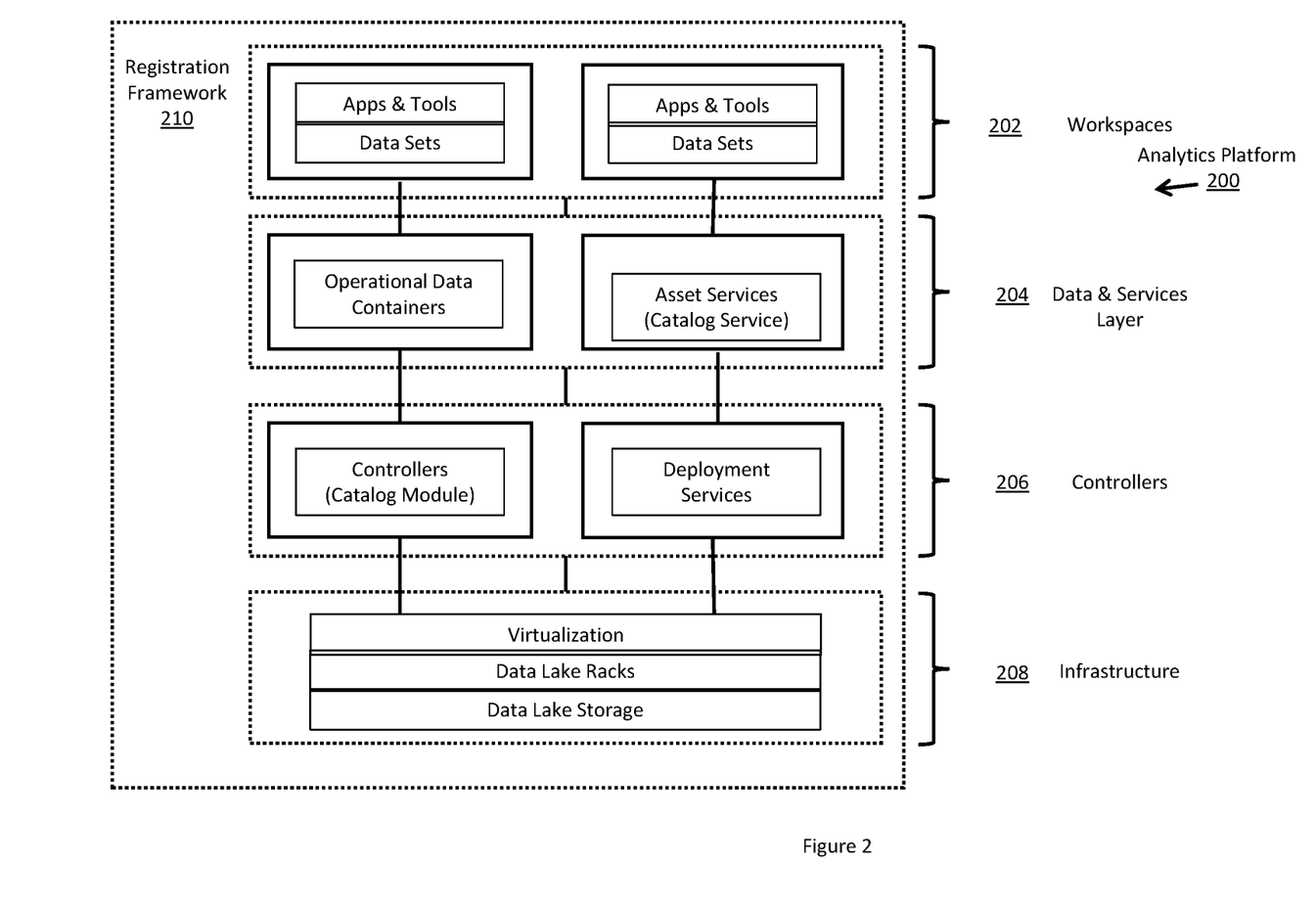
FIG. 2 illustrates another example of an analytics platform.

FIG. 2 illustrates an example of an analytics platform 200. The analytics platform 200 is an example of the analytics platform 100. FIG. 2 illustrates various layers or components of the analytics platform including, by way of example, workspaces 202, data and services layer 204, controllers 206, and an infrastructure 208. The analytics platform 200 also includes a registration framework 210, which is an example of the registration framework 106. In FIG. 2, the registration framework 210 may be associated with and interact with multiple components and features of the analytics platform 200. In one example, the registration framework 210 includes at least the catalog service and the catalog module. In one example, the catalog service allows a user to browse, navigate and search an asset roster. The catalog service may include or maintain the asset roster. In one example, the catalog module is configured to deploy assets such as data sets. The catalog module may deploy assets selected from the asset roster. The asset roster may also identify the locations of the assets. The components, modules, or services of the registration framework 210 may be placed in the same or different layers of the analytics platform 200. The registration framework 210 may be distributed within the analytics platform 200.

The asset roster can be navigated or browsed in multiple dimensions. For example, the catalog or registration framework may maintain information or metadata that describes relationships between assets or asset classes themselves, between assets and users, between assets and workspaces, and the like. A user may be able to discover assets used by a user associated with multiple workspaces. A user may be able to discover and use assets of a particular class that were delivered to different workspaces. A user may be able to discover and use an asset based on similarities between the class of an asset and the asset class of an asset deployed to a different user's workspace.

The workspaces 202 correspond to areas in which analytics may be performed. In one example, a workspace is an isolated, managed, self-service container of virtual machines (VM) and working assets (e.g., working data sets) configured and deployed within the analytics platform 200. The workspaces 202 establish the data sets and tools that are accessible by a user (e.g., a Data Scientist or other user) when interacting with the analytics platform and in particular when interacting with assets such as data sets. In one example, the workspaces 202 provide a quota-managed, policy-governed, private sandbox that enables data exploration, transformation, enhancement, and analysis. The workspaces 202 facilitate the use of tools, applications including business applications and services and help with the new development of analytic tools and analytic models. As shown in FIG. 2, each workspace may include applications, tools, and services that can perform operations on data sets or on analytic models or other assets of the analytics platform.

In one example, a workspace may include a computing device that is configured to access the data sets or other assets of the analytics platform 200. This may be done using a browser window or using specific applications. When a workspace is instantiated, the workspace may be provisioned with applications and/or tools. In other words, tools, applications and data sets or other assets may be deployed to a workspace. These applications and tools are used by a user to perform analytics on at least one data set or on a portion of a data set.

The analytics platform includes an infrastructure 208. The analytics platform 200 is configured to receive assets (e.g., data sets) from asset sources. The data sets or other assets ingested into the analytics platform 200 may have different formats and may be ingested into the infrastructure 208. The data sources 202 are often received by the analytics platform 200 in raw form.

More specifically, the infrastructure may include data lake storage, data lake racks, and a virtualization layer. The data lake storage is an example of a very large storage repository and includes multiple storage devices of the same or different types. The data lake storage corresponds, in one example, to the physical devices on which assets such as data sets may be stored. The data lake racks correspond, in one example, to the hardware supporting the data lake storage. The data lake rack may be an example of converged infrastructure and provides the other hardware components necessary to support the storage and may include processors, switches and other components. The virtualization includes the software and hardware to virtualize the underlying hardware and storage. The data sets received by the analytics platform 200 are stored in the data lake storage. The registration framework 200 may also use other storage and other infrastructures.

The storage layer or data lake storage may include data arrays, flash storage, disk storage, or the like or combination thereof. The infrastructure 208 may also include a virtualization layer and may provide virtualization services. The physical storage may be virtualized using different virtualization technologies. The virtualization layer allows resources to be dynamically provisioned and managed in one example.

In one example, the infrastructure 208 may be configured as a cluster (e.g., a Hadoop cluster) or as a distributed computing environment. The cluster may include multiple nodes and, in one embodiment, the nodes are virtual machines The controllers 206 are configured to deploy applications to the workspaces 202 via the data and services layer 204. The controllers 206 may also deploy certain applications automatically such as security application, indexing applications, searching applications, ingestion applications, and the like. In addition, the controllers 206 may also deploy data stores, data sets, workspace data and tools. In one example, the registration framework 210 is consulted to identify the specific assets to be deployed when provisioning a workspace or when deploying a requested asset. The controllers may also include service such as deployment services. Foundry services, which are an example of deployment services, may be used to deploy and manage the asset services. The controllers 206 may provide load balancing, for example. In some examples, an analytics platform may operate on multiple virtual machines. The controllers 206 including the foundry services enable and manage large scale distributed services and deployment. The controllers 206 may deploy assets to the operational data containers in the data and service layer 204 and/or to the workspaces 202. In some embodiments, published data containers may be present in addition to or in place of operational data containers. A published data container may be used for assets that are available to users and for deployment to workspaces (although assets can be deployed from operational data containers as well). Different container types can be used for different types of data sets. In one example, operational data containers may store the data in a storage such as a data lake. In one embodiment, the assets can be moved to a published data container and then to a workspace where the assets be accessed by users.

The workspaces 202 may interact with the data and services layer 204. The data and services layer 204 may include, by way of example, operational data containers and asset services such as cloud foundry platforms. Using operational data containers and suitable platforms such as cloud based platforms or other PaaS (platform as a service), the applications and tools can be deployed to the workspaces 104. In one example, the data and services layer 204 includes providing access to the asset roster, providing user interfaces, marketplace services, or the like. The data and services layer 204 includes operational data containers in which assets such as data sets are deployed. In one example, the assets are deployed to an operational data container and the workspaces 202 allow users to access the tools and data sets deployed therein. In one example, a controller from the controllers 206 may be configured to deploy assets from the infrastructure 208 to the operational data containers.

The controllers 206 may deploy assets into different types of operational data containers. In one example, the registration framework 210 may select a particular type of operational data container when deploying an asset. The registration framework may choose an operation data container that is most suitable for the asset begin deployed. Asset type, size, source, or other characteristic may influence the choice of operational data container.

In the analytics platform 200, a workspace 202 is an environment in which a user may work with or perform analytics with assets such as data sets. The analytics platform 200 may support multiple workspaces. For example, one or more data sets may be loaded into an operational data container associated with one of the workspaces 202. Tools and applications may also be loaded into the workspace or into the operational data container. A user may then analyze the data sets via the workspace using the tools and applications loaded into the workspace. In one example, a workspace may cooperate with a cluster of virtual machines to access and interact with the data.

In one example, an asset such as a data set may be deployed to an operational data container or a published data container. The asset (or portion thereof) in the operational data container may then be copied to the workspace. In one example, the data and services layer 204 may provide access to the asset and enable a user to request additional data.

In addition, the assets may be accessed in isolation. For example, a workspace may be available to a specific user or to a specific group of users. The assets deployed to that workspace or private sandbox are isolated, by way of example, in the sense that the users may be authenticated or authorized in order to access the assets deployed to the workspace.

In another example, the assets may be isolated in the sense that a copy of the data set may be deployed to the workspace, for example by loading the data set in a database application. The original data set or the source of the data set is isolated from changes that may be made to the copy of the data deployed to the workspace. Data sets can also be virtually provisioned in a workspace. This allows the workspace to have access to an external data store or data service.

Figure 3:
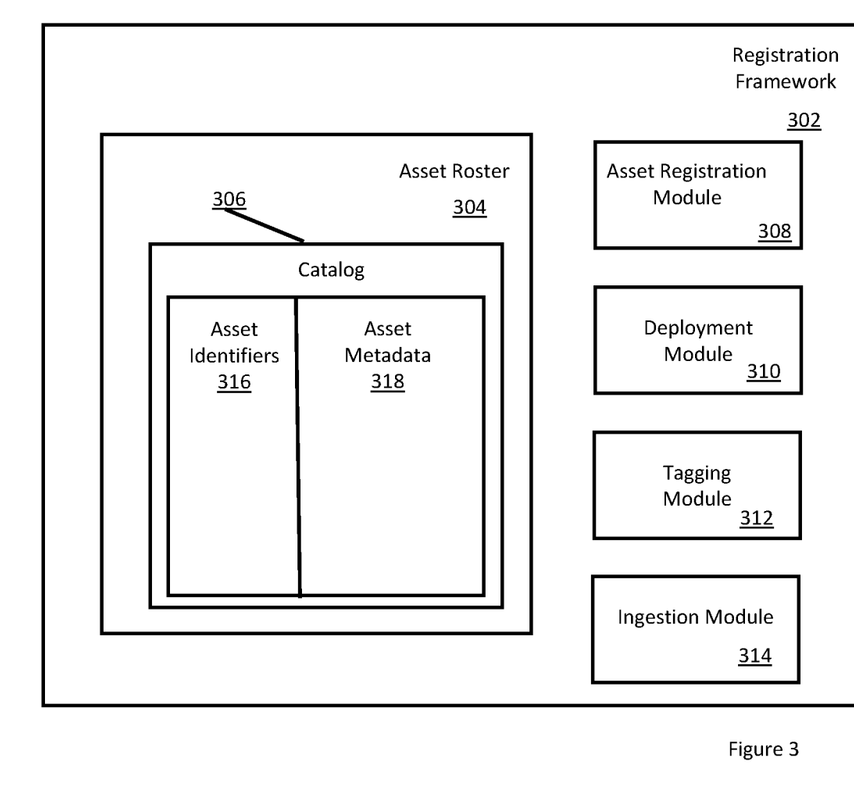
FIG. 3 illustrates an example of a registration framework that interacts with components or layers of the analytics platform.

FIG. 3 illustrates example components of a registration framework 302, which is an example of the registration framework 210. The registration framework 302 includes, by way of example and not limitation, an asset roster 304, an asset registration module 308, a deployment module 310, an asset tagging module 312, an ingestion module 314.

The asset roster 304 may identify the assets stored in the analytics platform. For example, the asset roster 304 may include or have access to a catalog 306. The catalog may include asset identifiers 316 and asset metadata 318. The asset identifiers 316 may identify the name and location of the asset. The asset metadata 318 may include information about the asset as previously described.

When searching for an asset, the search parameters can be compared with the asset identifiers and/or the asset metadata. The catalog 306 may be organized in a manner that facilitates a search. For example, the asset metadata may be further divided into additional fields that correspond to specific metadata. One field may contain information that is intrinsic to the asset. Another field may contain information related to deployment of the asset; another field may include user annotations. Other fields may include metadata reflecting required user roles or authorizations, annotations, quality ratings, inferred quality ratings based on user actions, asset state, and the like or combination thereof. In one example, the asset roster is effectively a catalog of assets that includes information necessary to locate the assets and provision or deploy the assets even though a different component of the analytics platform or of the registration framework 302 may actually provision a workspace or deploy the assets.

In another example, assets included in the analytics platform may be created. For example, models that receive data sets as inputs may be developed within the analytics platform. These models can be registered by the registration framework 302 and included in the asset roster 304. The asset roster 304 allows users to search and find not only data sets but also tools and applications for analyzing the data sets. Users can search for assets that are pertinent to a potential project.

The asset registration module 308 allows assets such as tools, programs, applications, data sets, data sources, data source connections, and the like to be registered with the registration framework 302. Many of these assets may be associated with services. The registration framework 302 stores information about these assets so that the assets can be shared among users. For example, a tool, as previously stated, is an example of an asset. As a result, the tools and information about the tools may be stored in the asset roster 304. The asset registration module 308, in addition to registering assets, allows a user to search for tools based on criteria or parameters. The asset registration module 308 allows a user to find and use tools or other assets that may be helpful within the user's workspace or for a user's purpose.

The asset registration module 308 may also be able to suggest tools or other assets to a user even when those tools or other assets are not identified or discovered by the search parameters. In fact, the asset registration module 308 may suggest assets to a user without any prompt or input from the user. For example, a user may be working with assets that may include a data set and various tools in a workspace. The asset registration module 308 may determine that one of the assets is similar to another asset in the analytics platform. In this case, the asset registration module 308 may recommend the similar asset to the user. In another example, the asset registration module 308 can determine or identify tools that were previously used on the asset or that were used on similar assets. The asset registration module 308 many then recommend that particular tool to the user. The asset registration module 308 may also recommend assets based on user profiles. Similar tools may be recommended to users with similar profiles. In one example, similar assets can be identified based on the asset's class. Similar assets can also be identified using the asset metadata.

Assets can also be tagged by the tagging module 312. This can be an automatic or a manual process. For example, the source of an asset such as a data set, security classification, sample size, or the like may be associated with the asset or partial asset being used. When an asset is tagged (or annotated), the information in the tag may be added to the asset roster 304. In one example, user provided annotations or tags may go through a verification process by a user with sufficient authority.

Controllers may be configured to deploy the tools or other assets as previously stated. The tools (or other assets) are deployed along with assets such as data sets into the workspaces in one example. In one example, the registration framework may facilitate a multi-controller approach. Different assets may be deployed, for example, using different controllers. Registering an asset with the analytics platform does not lock the asset into a specific deployment or a specific controller. Registration of an asset or an asset class may be a precursor to deployment and provisioning. Registration may also occur at the same time as deployment and provisioning in one example. Registration does not, however, lock an asset into a specific deployment or specific provisioning. The registration information of an asset may identify multiple controllers and the registration framework may consider this information when selecting a controller to deploy the asset. The deployment of an asset may be based on attributes of an end user, attributes of a workspace, other assets to be included in the deployment, and the like or combination thereof. The registration framework 302 allows assets to be deployed with tools or tool sets.

The registration framework is also extensible and allows new asset classes to be added. Asset classes, including new asset classes, may be associated with a manifest. The manifest is a collection of metadata that includes, by way of example, instructions for deploying assets with the asset class (although individual assets may have their own set of instructions), procedures for performing operations, and attributes of the asset class. The information included in the manifest may be collected for policy evaluation as discussed herein. Information or metadata associated with an asset class can be collected in the same manner as for an asset. The manifest may be included in the catalog 306.

In one example, the registration framework 302 also allows new classes of assets to be added. A user or customer may define an asset class. When an asset class is added, the class may be defined and the definition may be stored by the registration framework. In one example, the asset class can be registered without actually registering any assets (sometimes known as asset instances) at the time the class is created. In another example, the asset class may be defined when an asset is ingested into the analytics system. The definition of a class may include or identify the type of information (e.g., metadata) to be collected as well as deployment information or deployment instructions. The definition may also identify what tools, applications, and services should be deployed with the asset, and which controllers or services are best suited for use with the asset. A user defining the class may be queried about the parameters that affect deployment and this information may be maintained by the registration framework 302 and may be utilized by the ingestion module 314. This information may also address the state of the asset. For example, deploying an asset that is hydrated (e.g., already deployed) may be different from deploying an asset that is dehydrated (e.g., not yet deployed). The state of an asset may be associated with the steps necessary to deploy as asset from a source to a destination.

An asset such as a data set may be stored in an operational data container. The operational data container (ODC) may contain the information or data set that is deployed to a workspace. In one example, an operational data container may be a source of a data set used when performing analytics. An operational data container may be a structure in which other objects or assets are contained. Thus, a data set may be deployed (copied) to an operational data container and a workspace may use the data in the operational data container. For example, the data in the operational data container may be copied to the workspace. In one embodiment, operational data containers may be supplemented or replaced by published data containers.

The deployment module 310 may be configured to use the deployment information associated with the asset to deploy the asset. This may include selecting a controller, selecting an operational data container, and selecting or recommending tools, applications, or the like. The selected assets may be deployed by the deployment module 310.

Figure 4:
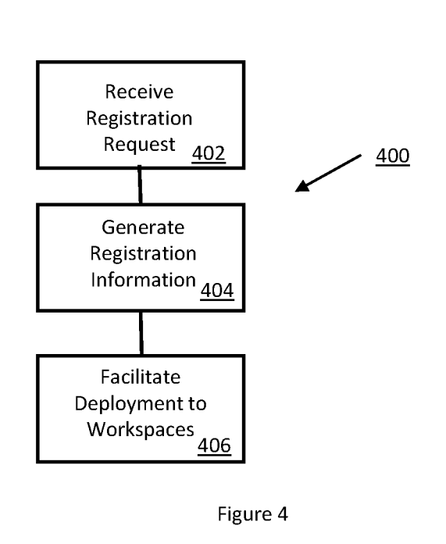
FIG. 4 illustrates an example of a method for registering a data set with an analytics platform.

FIG. 4 illustrates an example of a method 400 for registering an asset with an analytics platform. The registration framework can be used to register assets such as data sets, tools, applications, models, programs, or the like with the analytics platform.

In box 402, a registration request is received. A registration request can be received from a user. A registration request can also be generated automatically when asset is discovered in the analytics platform that is not registered with the analytics platform. Registration of an asset may include generating information or metadata about the asset.

In box 404, registration information is generated. Information is generated, for example, by collecting the information. The information can be collected automatically from the asset itself. The information can be collected by posing queries to a user. The information can also be collected by monitoring actions or operations that are performed on or with the asset. The information can also be collected over time as certain characteristics (e.g., data set quality, data lineage, data history, user satisfaction) are inferred or identified. The registration framework may include scripts that are performed during registration (or at another time) to collect information. For example, when an asset is initially registered, a dialog with the user may be conducted in order to generate the information. The dialog may query the user for information about the tools or other assets that should be deployed with the asset. Other information, such as authorized users, source identification, how to hydrate the asset, and the like may be collected or identified during registration.

More specifically and by way of example, generating registration information may include identifying, from the asset itself or by querying the user, a source of the asset, a name of the asset, classifications (e.g., ownership, security), asset class, and other metadata. When ingesting an asset, a user may be presented with certain questions. The responses to these questions may be included as metadata.

In one example, policies may be applied to registration requests to register an asset. The policies may be used to determine whether a user is eligible to register the asset. Eligibility may be based on user authorization, type of asset, class of asset, scope of registration, attributes of the asset or of the user or of the environment or other information.

In box 406, the registration framework can facilitate deployment of the asset at a later time. For example, when a request for the asset is received, the registration framework may facilitate the deployment of the asset. As previously suggested, the registration may facilitate deployment by accounting for the state of the asset, selecting preferred controllers, selecting preferred data containers, identifying system requirements, or the like or combination thereof. The registration framework may also be able to deploy the asset.

Figure 5:
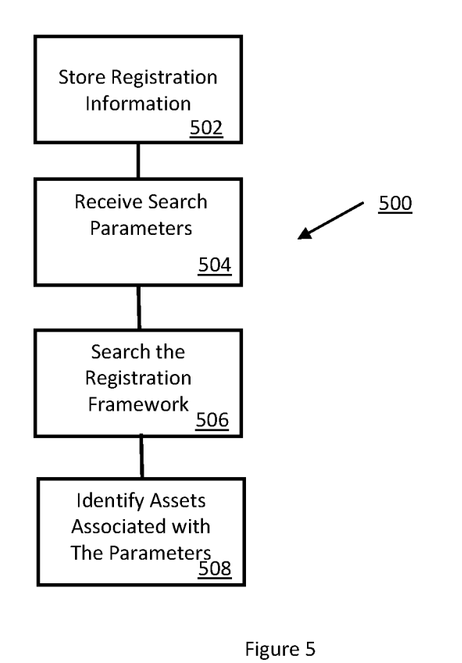
FIG. 5 illustrates an example of a method for discovering assets in an analytics platform.

FIG. 5 illustrates an example of a method 500 for discovering assets that have been registered by a registration framework included in an analytics platform. In box 502, registration information about assets is stored in a registration framework. The registration information stored in the asset roster includes metadata about the asset and is searchable. In one example, the method may begin in box 504. In box 504, search parameters are received by the registration framework. The search parameters may be received from a user. In one example, a user may be presented with fields in which the parameters may be entered.

In box 506, the registration framework (e.g., the asset roster) is searched based on the parameters received into a search request. The parameters can be compared against the registration information such as the asset identifiers and the asset metadata. In one example, the input fields may correspond to specific metadata types. This allows a user to configure the search parameters in specific ways. For example, the search may also be able to use search terms to exclude assets. For example, the search may be configured to exclude assets that are encrypted or that have personal data or that are older than a specified date. In box 508, assets that match or that substantially match the search parameters are identified and presented to the user. The parameters may be compared to the registration information to identify the assets that match or comply with the search parameters. A user may be able to select one or more assets from the results. When an asset is selected from the results, the deployment process may be initiated.

The embodiments disclosed herein may include the use of a special purpose or general-purpose computer or computers including various computer hardware or software modules, as discussed in greater detail below. The computers or computers may be virtual machines and may include distributed computer hardware. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for registering an asset in a registration framework of an analytics platform, the method comprising:
    receiving a registration request to register an asset with the analytics platform, wherein the asset includes a data set and wherein the analytics platform includes storage devices and processors, wherein the storage devices are configured as a data lake storing a plurality of data sets;
    collecting a first portion of registration information from the asset that is inherent or intrinsic to the asset;
    generating a second portion of the registration information from the asset when the asset is received into the analytics platform;
    ingesting the data set into the analytics platform;
    generating deployment information associated with the asset, wherein the deployment information facilitates deployment of the asset to a workspace when a request for the asset is received by the registration framework, wherein the deployment information identifies whether the asset needs to be transformed and automates a transformation of the asset during deployment to the workspace, wherein the registration framework is configured to deploy the asset to the workspace;
    adding the registration information and an asset identifier to an asset roster by:
        tagging the asset with the additional registration information; and
        including annotations made to the asset during or subsequent to registration of the asset in the registration information;
    discovering an asset in the asset roster by searching the asset roster using one or more search parameters or conditions, wherein the search parameters or conditions are compared with the registration information to identify assets that satisfy the one or more search parameters or conditions; and
    registering results of an operation performed on an asset or a transformation of an asset into a new asset, wherein the new asset is associated with an existing asset class or a new asset class.

2. The method of claim 1, further comprising:
    receiving a search request to find an asset in the analytics platform;
    searching the registration information in the asset roster based on the search request to identify assets that satisfy parameters and conditions of the search request; and
    responding to the search by identifying assets in the analytics platform that satisfy the parameters and conditions.

3. The method of claim 1, where in the asset comprises one or more of a data set, a data source, an application, a program, a tool, a service, a controller, a script, a service, a platform, an external data store, a streaming feed, or a connection to a data set.

4. The method of claim 1, wherein generating the deployment information includes adding details for deploying the asset to a workspace, adding parameters for deploying the asset, addressing a state of the asset, wherein the details, parameters and state are included in the deployment information.

5. The method of claim 1, wherein generating the deployment information includes identifying one or more of a container type into which the asset is to be deployed, a controller to deploy the asset, or a transformation of the asset.

6. The method of claim 1, further comprising adding a new asset class to the registration framework, wherein adding a new asset class includes collecting information that defines the new asset class.

7. The method of claim 1, wherein the registration request is for a new asset that is not in the analytics platform or for an existing asset is already present in the analytics platform.

8. The method of claim 1, further comprising associating the asset with services and controllers associated with the analytics platform in the registration information.

9. The method of claim 1, further comprising storing a history of the asset in the registration information, wherein the history identifies one or more versions of the asset, prior transformations of the asset, a lineage of the asset, or one or more subsets of the asset.

* * * * *